April 7, 1925.

F. W. STEWART

MOLD FOR MAKING GLASSWARE

Filed Feb. 23, 1923

1,532,162

INVENTOR
Frederick W. Stewart
By Kay Totten Brun
attys

Patented Apr. 7, 1925.

1,532,162

UNITED STATES PATENT OFFICE.

FREDERICK W. STEWART, OF OAK PARK, ILLINOIS, ASSIGNOR TO INLAND GLASS COMPANY, OF CHICAGO, ILLINOIS, A CORPORATION OF DELAWARE.

MOLD FOR MAKING GLASSWARE.

Application filed February 23, 1923. Serial No. 620,673.

*To all whom it may concern:*

Be it known that I, FREDERICK W. STEWART, a citizen of the United States, and resident of Oak Park, in the county of Cook and State of Illinois, have invented a new and useful Improvement in Molds for Making Glassware; and I do hereby declare the following to be a full, clear, and exact description thereof.

My invention relates to molds for making glassware.

The object of my invention is to provide a simple and efficient form of mold for making a globe, shade or like round or bulbous article in which the lower half or portion of the globe is fluted and the upper half plain, with scallops formed where the fluted portion and plain portion meet, it being customary to apply a coating of enamel to the upper plain portion so as to make it translucent, as distinguished from the lower transparent fluted portion.

To these ends my invention comprises the novel features hereinafter set forth and claimed.

Figure 1:
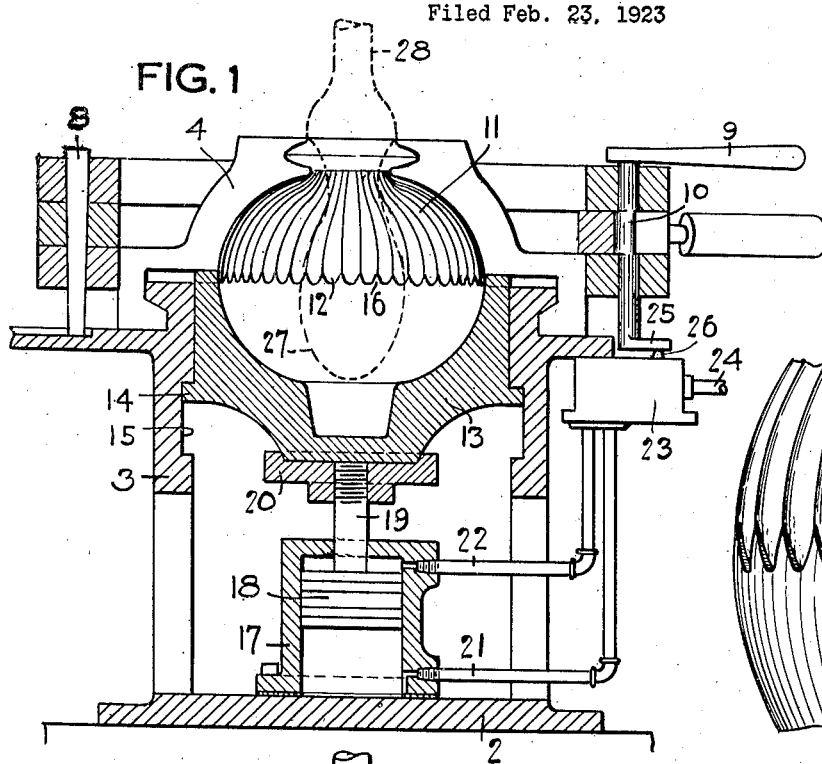
Figure 3:
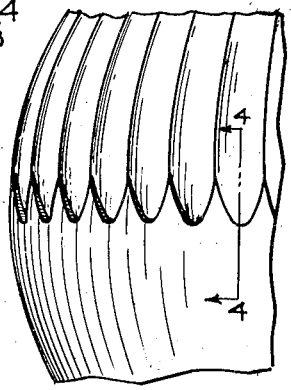
Figure 2:
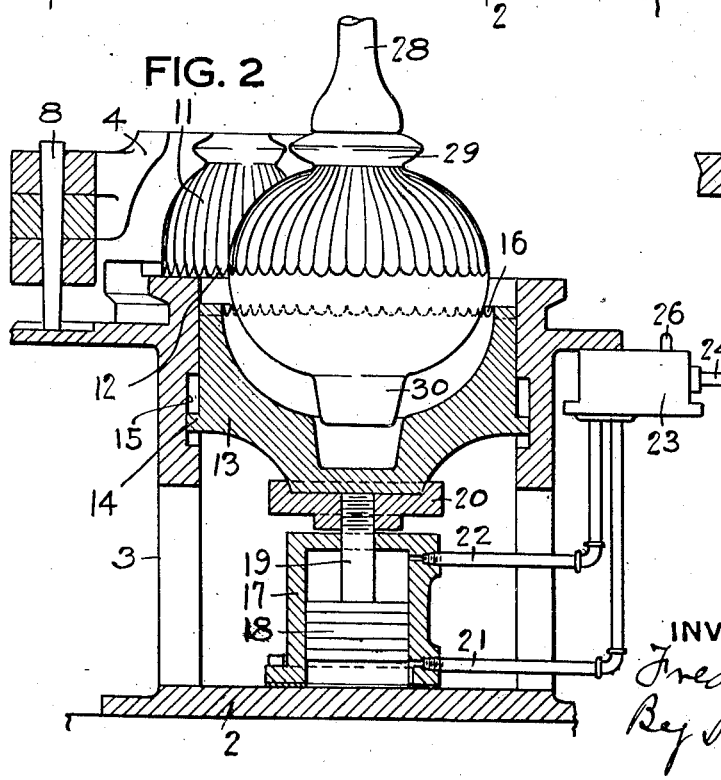
Figure 4:
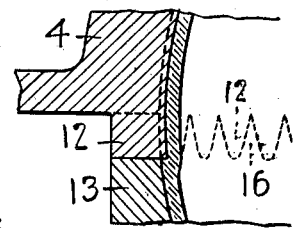
Figure 5:
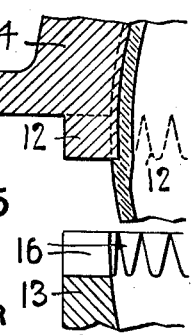

In the drawing, Fig. 1 is a sectional elevation of my improved mold ready for the blowing operation; Fig. 2 is a like view showing the position of the parts of the mold after the globe has been blown and is being removed from the mold; Fig. 3 is an enlarged detail of a portion of the globe after it has been removed; and Figs. 4 and 5 are details of portions of the mold.

In the drawing, the numeral 2 designates a suitable base supporting the frame 3.

Mounted on the frame 3 is the upper mold-part 4 which may be made up of two or more sections, that are shown as consisting of three sections, each connected by a hinge pin, as at 8, and adapted to be locked by the handle 9 connected to the cam pin 10, all as in the ordinary construction of such three-part molds.

The inner walls of the upper mold-part 4 are formed with flutes all terminating with the scalloped edge 12.

The lower mold part 13 is a one-piece structure and is arranged to move up and down, and for this purpose is provided with the flange 14 which is adapted to move up and down in the guide 15.

The upper edge of the lower mold half 13 is provided with the scallops 16 which are adapted to intermesh with the scallops 12 of the upper mold part when such lower mold part is in its operating position, as shown in Fig. 1.

The cylinder 17 is mounted on the base 2, said cylinder having the piston 18 therein with the piston rod 19 connected to the collar 20, which in turn is connected to the lower mold half 13.

Air or other fluid for operating the piston 18 is supplied by the pipes 21 and 22, said pipes being connected up to a suitable valve 23 with which the supply pipe 24 connects. In order to provide for the simultaneous movement of the upper mold part 4 and the lower mold part 13, the lower end of the cam pin 10 is provided with the finger 25 which is adapted to engage the stub 26 for operating the valve 23.

When my improved mold is in use, the molten glass 27 which has been gathered on the end of the blow pipe 28 is introduced into the mold cavity, the mold sections closed and the handle 9 is thrown around to lock the sections of the upper mold portion 4, and in moving said handle the finger 25 engages the stub 26 of the valve 23 which admits air by the pipe 21 to the lower end of the cylinder 17, thereby raising the piston and the lower mold portion 13 to the positions shown in Fig. 1. Air is then applied to blow the glass to conform to the shape of the mold cavity, whereupon the operator throws the handle 9 to open the upper mold part 4, and at the same time the finger 25 releases the stub 26 which rises and air is admitted by the pipe 22 to the upper end of the cylinder 17, whereby the piston is lowered and with it the lower mold half 13. The parts will then be in the position shown in Fig. 2, which shows the scallops of the mold halves disengaged to permit the opening of the mold-sections of the upper mold-part without in any way distorting the scallops formed on the article, said scallops being clearly indicated in Fig. 3. The globe is then withdrawn from the mold, as shown in Fig. 2, and the parts 29 and 30 are cracked off in the ordinary manner.

In most cases the upper plain half of the globe is provided with a coating of enamel to make the upper half of the globe translucent, and this enamel may be applied by spraying or in any other suitable manner, the fluted portion of the globe being protected by a suitable covering during this spraying operation. The enamel is then hardened by baking in a suitable kiln or oven.

By my improved mold I provide a very simple way of forming such globes, the withdrawal of the lower mold-half, forming the scallops, permitting the opening out of the upper mold sections without any interference, and no extraordinary skill is required in the producing of the article by this mold. By having the lower mold-half movable downwardly the said mold-half may be made in one piece and so avoid the fins which would be formed in the glass where the different sections of the mold-half joined.

What I claim:

1. A mold for forming articles of glassware comprising an upper mold part made up of horizontal swinging sections, the inner walls of said mold part having flutes formed therein terminating in scallops, a vertically movable lower mold part having scallops at its upper edge engaging with said first named scallops, a cylinder, a piston, connections between said lower mold part and said piston, and means for admitting fluid to points above and below said piston.

2. A mold for forming glass articles comprising an upper mold part made up of horizontal swinging sections, the inner walls of said mold part having flutes formed therein terminating in scallops, a vertically movable lower mold part having scallops at its upper edge adapted to engage with the first-named scallops, a cylinder, a piston, connections between said piston and said lower mold part, a fluid supply pipe, a valve, a handle for closing said upper mold sections, connections between said handle and said valve, whereby when said handle is moved to close said upper section the fluid is admitted to the lower end of said cylinder, and when said handle is moved to open said mold sections the fluid is admitted to the upper end of said cylinder.

In testimony whereof I, the said FREDERICK W. STEWART, have hereunto set my hand.

FREDERICK W. STEWART.